July 16, 1968          B. J. MILLER          3,392,581
LIQUID LEVEL SENSING AND CONTROL DEVICE
Filed May 24, 1966          3 Sheets-Sheet 1

INVENTOR
BERNARD J. MILLER
BY
Caesar, Rivise, Bernstein & Cohen
ATTORNEYS.

July 16, 1968 B. J. MILLER 3,392,581
LIQUID LEVEL SENSING AND CONTROL DEVICE
Filed May 24, 1966 3 Sheets-Sheet 2

INVENTOR
BERNARD J. MILLER
BY
Caesar, Rivise, Bernstein & Cohen
ATTORNEYS.

July 16, 1968  B. J. MILLER  3,392,581
LIQUID LEVEL SENSING AND CONTROL DEVICE
Filed May 24, 1966  3 Sheets-Sheet 3

INVENTOR.
BERNARD J. MILLER
BY
Caesar, Rivise, Bernstein & Cohen
ATTORNEYS.

3,392,581
LIQUID LEVEL SENSING AND
CONTROL DEVICE
Bernard J. Miller, Lafayette Hills, Pa. 19444
Filed May 24, 1966, Ser. No. 552,497
3 Claims. (Cl. 73—304)

ABSTRACT OF THE DISCLOSURE

A liquid sensing device for detecting the presence of moving liquid having at least some electroconductivity to act as a conductive plate in the capacitor arrangement, the device including a sensing probe, and a Venturi arrangement downstream of the probe to draw an auxiliary flow of liquid past the probe and through the tube to create turbulence adjacent the probe to assure good liquid contact with the probe and to promote a cleansing action on the probe.

---

This invention relates to a novel liquid level sensing and control device particularly intended for use in boats and ships, and has as one of its principal objectives the provision of an overall liquid level control device which possesses a wide utility, simplicity and reliability that has not been obtained by devices currently in use. The present invention also embodies a liquid sensing device which does not have any moving parts but can be conveniently located as permitted by the physical layout of the general area.

It is known to provide water sensing devices in the hull or base of a ship in order to indicate the presence of bilge. However, these devices have generally not given a continuous indication of liquid level but have rather been operable either on an incremental basis or on a maximum level basis. For instance, several devices have been proposed whereby the rise of liquid level to a given point completes a circuit. However, the further rise of the liquid level will not be readily apparent until a predetermined high point is reached by the liquid level. Hence, such devices will not indicate any intermediate values of liquid level and thus the user is never certain as to when the next higher point level indication will be reached. Such devices are therefore described as incremental.

The maximum level devices are of a similar nature in that such devices do not come into operation until a predetermined level is reached. Such devices do not actually indicate the liquid level.

In addition to the foregoing, it has been found that many of the devices presently utilized for measuring bilge level are mechanical devices which utlize, for instance, a float. Thus, such devices are subject to the failings of mechanical devices, for instance, whenever the float operation is obstructed by foreign materials, which obstruction is a real possibility in open waters.

While it has been suggested that measuring devices be utilized which rely upon the principle of the increase of electrical condenser capacitance or increased current flow with the rise of liquid between the plates of an electrical capacitor, such devices do not appear to have come into practical usage. Such electrical capacitor sensing devices have not been commercialized, and it is believed that one reason for such failure of commercialization may lie in the troubles of electrolysis, fragility and extreme unpredictability. In particular, where the liquid being measured is the capacitive element, dangerous electrolysis can be experienced which will dissolve away propellers, shafts, rudders and even screw fasteners in the hull and possibly even the hull itself, if made of metal.

Also, it is necessary to include a liquid level sensing device into an overall assembly which will have a control function. For instance, it is the present practice aboard ships to turn on bilge pumps periodically. If no liquid emerges from the pump exhaust, it is assumed that no bilge has collected. However, this is not necessarily a correct assumption since the pump inlet pipe may have become clogged and therefore with the turning off of the bilge pump, the bilge will continue to collect from an intermediate level instead of from a low level had the pump been permitted to continue to operate until all of the bilge had been ejected from the hull.

Still another need for a control device has been recognized by the present applicatnt in connection with the raw water pumps. Should the raw water pump inlet line become clogged, the raw water pumps will continue to operate without drawing water and thus the ship engine could be damaged severely or totally. The present applicant has therefore recognized the need for a device which will indicate the absence of water as well as the presence of water and which will convey the same to an appropriate control device.

It is therefore an object of the present invention to provide a liquid level sensing and control device which may be used in boats and ships.

Another object of the present invention is to provide a liquid level sensing and control device which possesses a wide utility, simplicity and reliability that has not been obtained by devices currently in use.

Yet another object of the present invention is to provide a liquid level sensing and control device which does not have any moving parts, and which can be conveniently located as permitted by the physical layout of the general area.

Still another object of the present invention is to provide a liquid level sensing and control device which will give a continuous indication of liquid level.

Yet another object of the present invention is to provide a liquid level sensing and control device which will actuate at a predetermined liquid level an alarm system, such as a warning buzzer or a light.

Yet another object of the present invention is to provide a liquid level sensing and control device which is incorporated into an overall assembly having a control function, such as the turning on or the turning off of pumps.

Still another object of the present invention is to provide a liquid level sensing and control device which is explosion-proof and spark-proof and which does not make physical contact with the hull of a ship or boat.

The foregoing as well as other objects of the invention are achieved by providing a liquid level sensing and control device which includes a source of power associated with an oscillator which has an output frequency that varies in accordance with the level of liquid in contact with an encapsulated sensing probe that is associated with the oscillator. The conductive member of the sensing probe effectively forms one terminal of a capacitor arrangement, with the encapsulating material (plastic) constituting the dielectric. The liquid whose level is being measured forms the second terminal of a capacitor with the dissolved solids and impurities therein providing sufficient conductivity.

The oscillator output is fed to two filters which effectively constitute resonant circuits that are held at a predetermined frequency. If the oscillator output frequency is equal to the frequency of the filters there will be no current flow to a meter. However, if the oscillator's frequency does not match the predetermined frequency of the filter, there will be a current flow through a rectifier and hence there will be a reading on the meter. Relays may be associated with the meter in order to feed the meter output to a control circuit such as a bell, a light or a switch, the switch functioning to turn on or turn off pumps as the case may be. The meter may be removed a considerable distance from the sensing probe, and in this way the actual level of the bilge or feed to the raw water pumps may be visually and continuously determined on the deck of the ship or other convenient place.

Of further significance is the fact that the sensing probe is specially constructed and basically includes a conductive hollow tube which is completely encapsulated in an impervious material such as plastic. The utilization of a tube greatly enhances the effectiveness of the sensing probe.

Other objects and many of the attendant advantages of the present invention will be readily appreciated as the same becomes better understood by reference to the following detailed description when considered in connection with the accompanying drawings wherein.

Figure 1:
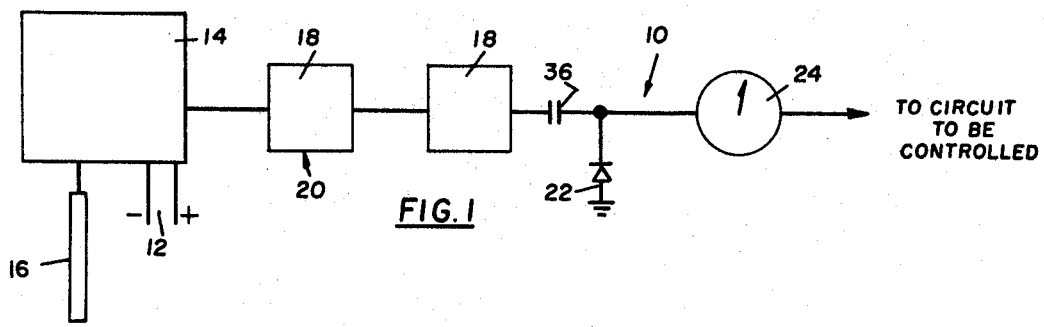
FIG. 1 is a schematic view of a circuit showing the liquid level sensing and control device of the present invention.
Figure 5:
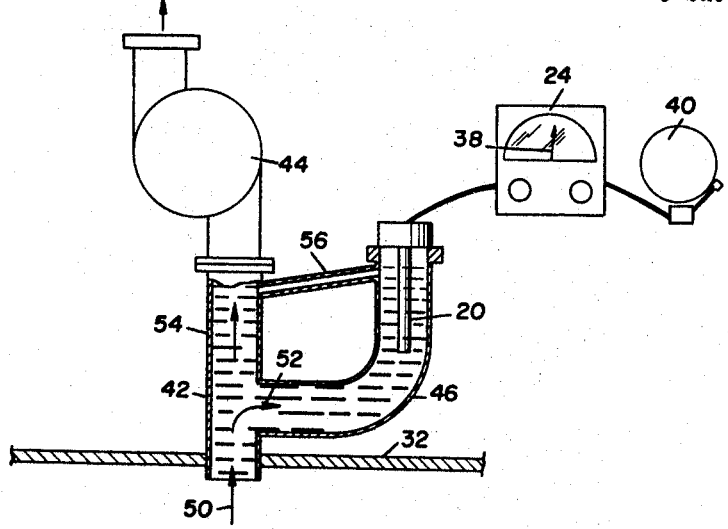
FIG. 5 is an enlarged view of a portion of FIG. 4 and showing in particular the association of the present invention with the raw water pump inlet line.

Referring now in greater detail to the various figures of the drawings wherein similar reference characters refer to similar parts, a schematic view of a circuit showing a liquid level sensing and control device embodying the present invention is generally shown at 10 in FIG. 1. The circuit 10 basically comprises power source 12, oscillator 14, sensing probe 16 and filters 18, all of which together constitute a sensing unit 20. When the sensing unit 20 is coupled with diode 22 and meter 24, there is thereby constituted the liquid level sensing device of the present invention.

The power source 12 is an appropriate source of current which may be drawn from either the ship's electrical system or storage batteries with appropriate means to provide the proper biasing voltages to the oscillator circuitry.

Power is fed to the oscillator 14 which is of a well known construction. The output from the oscillator 14 is varied in accordance with the level of liquid in contact with sensing probe 16. That is, as will be seen hereinafter, as the amount of liquid in contact with probe 16 varies, the capacitance in the turning circuit of oscillator 14 varies.

Figure 2:
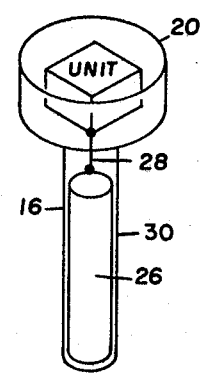
FIG. 2 is an enlarged view showing the combination sensing probe and sensing unit of the present invention.

As shown in further detail in FIG. 2, the sensing probe 16 forms a substantial portion of the sensing unit 20. The sensing probe 16 basically comprises a hollow conductive tube 26, of for instance copper, and is connected electrically with the remainder of the sensing unit 20 by means of conductor 28. As further shown in FIG. 2, the conductive tube 26 is completely encapsulated in an impervious plastic envelope 30 which may be of a plastic of an acrylic type or other types of plastic which are impervious and which can withstand considerable handling and exposure to open waters for long periods of time in such a way that they will not swell or otherwise become affected so as to hinder the operation of the sensing unit.

The probe 16 is thus a variable capacitor. The capacitance is varied by building up and decreasing the area of a second plate as liquid makes contact with the outer surface of envelope 30. That is, as the area of the plates of a capacitor is enlarged or decreased, the capacitance varies in accordance with the area of the plates of the capacitor. Thus as the liquid makes contact with the outer plastic envelope 30, a second plate of the capacitor is formed. The first plate of the capacitor is the outer surface of the conductive tube 26. The capacitance of the probe 16 is thus varied by the amount of liquid in contact with the outer surface of envelope 30.

The use of a hollow conductive tube 26 which is completely encapsulated has been found to greatly enhance the sensitivity, accuracy and effectiveness of the sensing probe 16 is compared with the use of plates or rod-like members.

That is, in conventional probes the capacitance of the probe is changed as the dielectric between the plates is changed. Thus, as liquid level rises between the plates of a conventional probe the dielectric between the inner and outer plates is changed thereby changing the capacitance of the probe.

In the probe of the instant invention, there is no capacitance at all unless there is some contact made between the liquid and the outer envelope 30, in that there is no second plate unless liquid is in contact with the envelope 30. In this manner, the probe is especially sensitive to the presence or absence of liquid contact with the probe.

It can also be seen that the probe does not rely on the dielectric value of the liquid sensed for since the encapsulating plastic is the dielectric. That is, the dielectric value of the liquid is not determinitive of the change in capacitance of the probe. The value of the capacitance in the probe changes only as the amount of liquid which comes into contact with the outer envelope 30 varies. Thus the probe may be used with any liquid for the determination of its presence or absence as well as the amount thereof.

Figure 3:
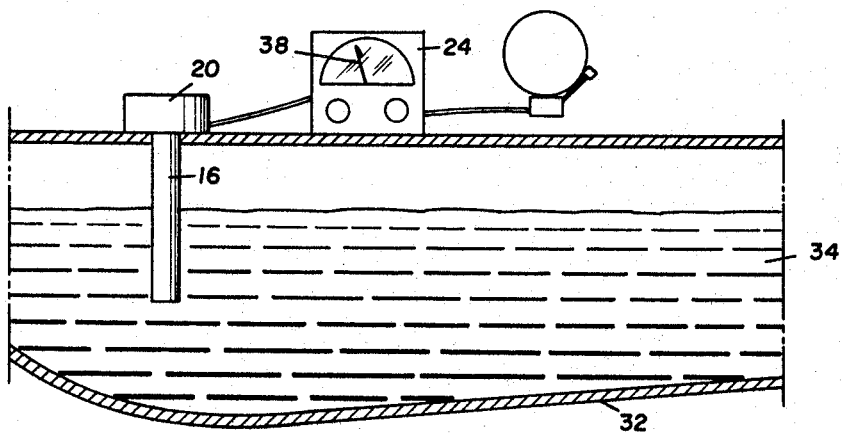
FIG. 3 is a schematic view partly in section showing the liquid level sensing and control device of the present invention installed in the hull of a ship and having an alarm device associated therewith, the hull of the ship being filled with a considerable amount of bilge.

It is to be noted, as illustrated in FIG. 3 that the sensing probe 16 does not make physical contact with the hull 32 of a ship. Instead, the sensing probe 16 relies for its operation on the fact that the hull 32 is grounded and upon the further fact that the bilge 34 is somewhat conductive because of dissolved solids and impurities, and therefore permits the building up of a second capacitor terminal as the liquid level rises.

As previously stated, the output from the oscillator 14, as varied by the level of bilge in contact with the sensing probe 16, is fed to the two filters 18. While the use of one filter would produce satisfactory results, it is preferred to use two filters in order to obtain the highest practical discrimination.

The filters 18 are held at a predetermined frequency. In this manner the two filters 18 constitute resonant circuits. Thus, if the output frequency from oscillator 14 is equal to the predetermined frequency there will be no current flow to meter 24. However, if the output from the oscillator 14 does not match the frequency of the filters, there will be a current flow through diode 22 which functions as a rectifier in order that direct current be fed to the meter 24. A leveling capacitor 36 is inserted in the line between the second filter 18 and the diode 22.

From the meter 24, a signal may be sent to relays (not shown) for purposes of operating a control circuit such as a bell, a light, or a switch as will be explained in greater detail hereinafter.

It is to be noted, however, that the sensing probe of the present invention will give a continuous reading on the meter 24 since a signal is constantly being fed to the meter 24 from the sensing probe. Also, the sensing unit of the present invention does not have any moving parts and is explosion-proof and spark-proof. Furthermore, it does not make physical contact with the hull 32 and there are no electrolysis problems occasioned by the use of the sensing probe of the present invention.

Furthermore, the sensing probe can be conveniently located as permitted by the physical layout of the hull and also is relatively simple in construction and reliable in use.

The sensing unit 20 of the present invention is incorporated into an overall control device as illustrated in FIGS. 3, 4, 5, and 6.

FIG. 3 is a schematic view showing the sensing unit 20 installed in the hull 32 of a ship which contains bilge 34. It is to be noted that the meter 24 may be directly read, and can be located at a point far removed from the hull, for instance on the deck.

When the level bilge 34 rises to a predetermined level, the advanced position of the needle 38 of the meter 24 will automatically close the switch (not shown) which will actuate an alarm 40 and a warning light (not shown) that may be associated therewith. Furthermore, the closing of a switch or relay at the predetermined time can also initiate the operation of bilge pumps (not shown) in order to remove the bilge 34 from hull 32. As the water is removed, the needle 38 of the meter 24 constantly indicates the falling level of bilge and thus the viewer will be able to determine when the bilge level has fallen to a desired practical minimum level. It is also contemplated that the fall of the needle 38 will open the circuit to the bilge pump and thereby automatically turn off the bilge pump. Thus, it is seen that the bilge discharge system of the present invention can be made completely automatic.

Figure 4:
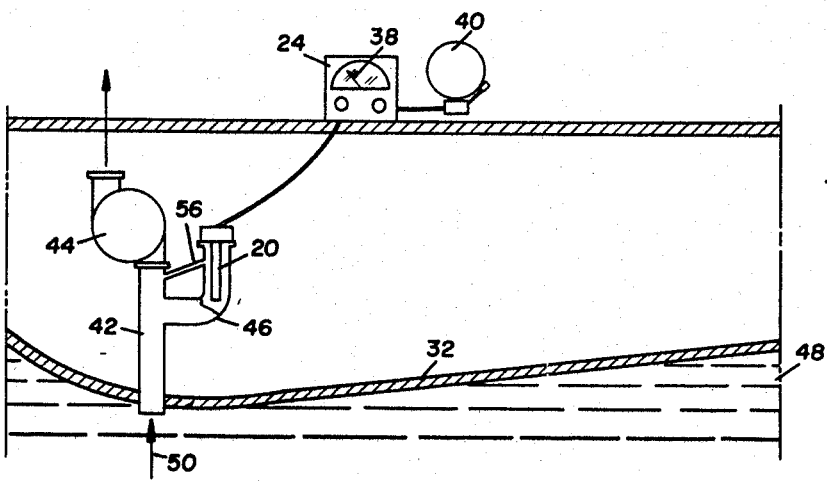
FIG. 4 is a view similar to FIG. 3 but wherein the device of the present invention is associated with the inlet line of a raw water pump and the meter indicating that water is being drawn into the inlet line by the pump.

FIG. 4 illustrates the combination of the sensing unit of the present invention with another type of control device, namely, to indicate and control water being drawn into inlet line 42 of raw water pump 44. As shown in FIG. 4, the sensing unit 20 is inserted in one branch of an elbow 46. Outside water 48 is drawn inwardly in the direction of arrow 50 into inlet line 42 and then to the raw water pump 44. In so doing, the water also enters the elbow 46. As long as this occurs, the meter 24 will show a reading as indicated in FIG. 4. The foregoing arrangement is shown in further detail in FIGS. 5 and 6 wherein the water reaching the sensing unit 20 is illustrated by the arrow 52 and the water moving to the raw water pump 44 is illustrated by the arrow 54. A pressure equalization line 56 is provided in a well known manner.

Figure 6:
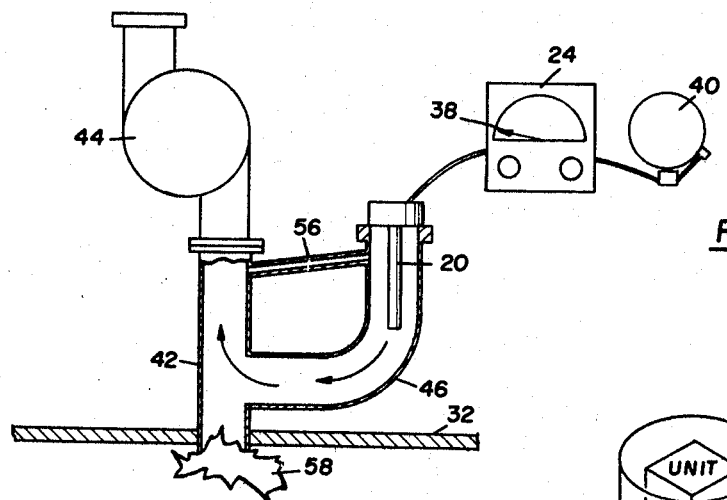
FIG. 6 is a view similar to FIG. 5 but wherein the inlet line has become clogged.

Should the inlet line 42 become clogged by debris 58 as shown in FIG. 6, the outside water will no longer be able to be drawn into the inlet line 42 and all water in contact with the sensing unit 20 will also be moved from the structure. When this occurs the needle 38 of the meter 24 will immediately fall to a zero reading. This in turn will cause an actuation of alarm 40 through appropriate relays (not shown) and furthermore will immediately halt the operation of the raw water pump 44. As soon as the debris 58 is removed from the entrance to inlet line 42 and water again contacts the sensing unit 20, the raw water pump 44 will through relays immediately start its action again. In this manner the damage to the ship engine from overheating for failure to have the cooling effect of the raw water will be essentially completely eliminated.

Figure 7:
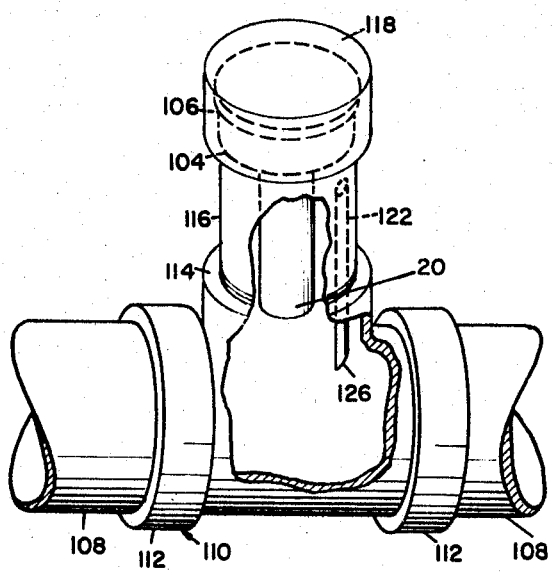
FIG. 7 is a perspective view of a plug embodying the invention for determining the presence of fluid flow in a pipe line with parts removed for purposes of clarity.
Figure 8:
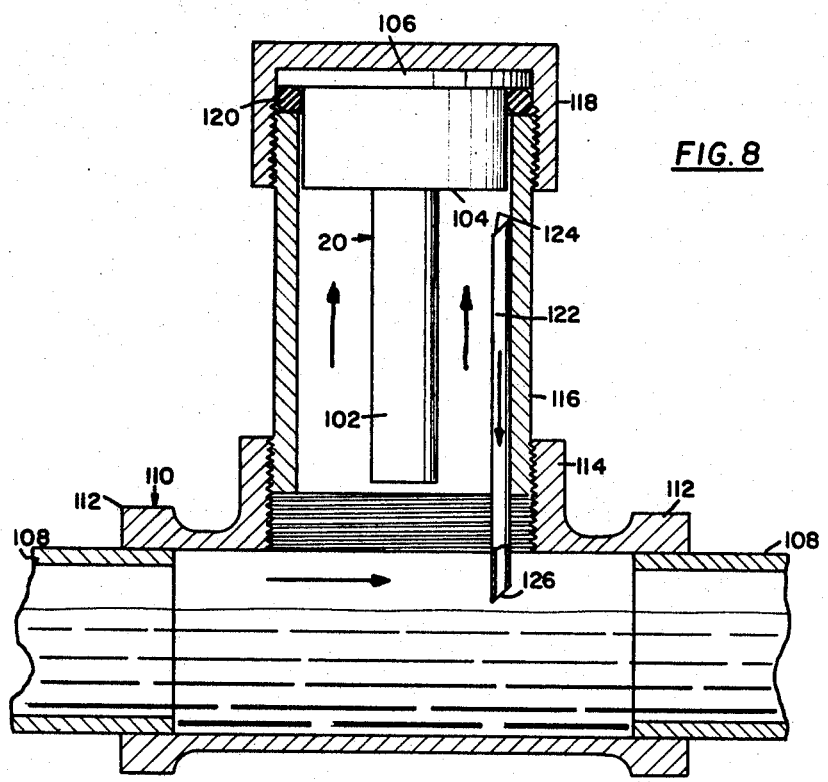
FIG. 8 is a vertical sectional view of the invention with the plug secured in the pipe line.

Attention is now referred to FIGS. 7 and 8 of the drawing which show the sensing unit of the present invention incorporated into a plug device and the further presence of a novel Venturi tube for assuring that any liquid flowing past the sensing unit will be drawn into contact therewith as well as promoting a cleansing action.

As shown in FIG. 8 the sensing unit 20 includes sensing probe 102 that depends downwardly or away from head 104. As further shown in FIG. 8 the head 104 also includes a top flange that is somewhat wider or of a greater diameter than the head 104. The flange 106 is utilized for securing the sensing unit 20 in place as will be described hereinafter.

The sensing unit 20 is secured in operative communication with the raw water line or pipe 108 by means of a connection T 110 with side branches 112 and middle branch 114. The side branches 112 will be tightly secured to the pipe 108 by threads, flanges or other means well known to the art. The middle branch 114 possesses female threads (FIG. 8) which receive the male threads formed on the lower end of connecting pipe 116.

The connecting pipe 116 also has male threads formed adjacent its upper end in order to secure a cap 118 which has complementary female threads. This is done by interposing a sealing ring 120 (FIG. 8) between flange 106 and the upper end of connecting pipe 116. When the cap 118 is tightened upon connecting pipe 116, the sealing ring is eventually compressed in order to provide a tight seal. In the arrangement of FIG. 8 there is preferably a small space between head 104 and the connecting pipe 116.

As further shown in FIG. 8 a tube 122 is welded or otherwise secured to the internal surface of connecting pipe 116, slightly downstream or behind sensing probe 102. The tube 122 is bevelled at both ends with top bevel 124 facing generally toward sensing probe 102 and bottom bevel 126 facing away from sensing probe 102.

The tube 122 is provided to insure that any liquid flowing in pipe 108 will be drawn into contact with sensing probe 102 as well as promoting a cleansing action. As shown in FIG. 8 the raw water or other liquid is drawn through pipe 108 in a direction from left to right as indicated by the arrow. The pressure of the flowing water will normally force it to rise within connecting pipe 116 as indicated between two arrows.

With the presence of tube 122 and particularly the bottom bevel 126, the flowing water in pipe 108 tends to create a suction action downwardly through tube 122 in the direction of the arrow in accordance with the so-called Venturi effect. Thus the water rising through connecting pipe 116 is drawn downwardly through tube 122 in the direction of the arrow. This has the effect of assuring a turbulent flow pattern about sensing probe 102 whenever water is flowing through pipe 108. The turbulent action thus produced tends to avoid obstruction of the sensing probe 102, and also has a cleansing effect so that impurities will not collect upon the sensing probe 102 to give a false reading as to the presence of water.

It is thus seen that the present invention provides an effective means for detecting or measuring the presence or height of water.

In the present invention the encapsulated terminal is one terminal of a capacitor arrangement with the liquid whose level is being measured forming the second terminal of the capacitor. Thus with the present invention, electrolysis is not a problem as with devices wherein the liquid being measured was passed between a pair of terminals with such liquid being the dielectric. In such a case, one of the terminals tends to disintegrate after a period of use by virtue of electrolysis thereby introducing a factor of unreliability.

Furthermore, where the liquid being measured is the capacitive element, dangerous electrolysis can be experienced which will dissolve away propellers, shafts, rudders and even screw fasteners in the hull and possibly even the hull itself, if made of metal.

With the present invention, the encapsulating plastic is the dielectric. There are a variety of long lasting plastics on the market, such as acrylic, vinyl, polyethylene, etc. which are quite satisfactory as encapsulating materials.

In view of the foregoing, yet a further advantage of the present invention is that a sensing probe is sturdy and will endure rough treatment for unlimited periods of time to furnish reliable results.

This application is a continuation-in-part application based upon application Ser. No. 332,291, filed Dec. 23, 1963, and entitled, Liquid Level Sensing and Control Device.

Without further elaboration, the foregoing will so fully illustrate my invention, that others may, by applying current knowledge, readily adapt the same for use under various conditions of service.

What is claimed as the invention is:

1. A liquid sensing device for detecting the presence of moving liquid having at least some electroconductivity to act as a conductive plate in a capacitor arrangement, said device comprising a sensing unit having a sensing probe, a raw water line wherein said liquid normally flows from an upstream source past said sensing probe in a main flow toward a downstream direction with the main flow of said liquid making physical contact with said probe, said sensing probe including a terminal surrounded by a dielectric, a source of power associated with said terminal, and a means for mounting said probe in said water line including a hollow Venturi tube having first and second ends both being open with said first end being located in said liquid main flow adjacent to but downstream from said sensing probe and said second end being in contact with said liquid but being away from said main flow in close proximity to said sensing probe whereby said liquid main flow interacts with said first end of said Venturi tube to draw a partial vacuum through said tube toward said first end to initiate an auxiliary flow of liquid away from said main flow, past said probe and then into said second end of said tube, toward said first end to return to said main flow whereby turbulence is created adjacent said sensing probe to assure good liquid contact with said sensing probe and also to promote a cleansing action upon said sensing probe.

2. The invention of claim 1 wherein said first end is bevelled so as to open generally away from said sensing probe with said second end being bevelled to open toward said sensing probe.

3. A liquid sensing device comprising a sensing unit having a sensing probe including a terminal and dielectric, a source of power associated with said terminal, and means to allow said liquid to come in contact with said dielectric only, said liquid being at least slightly electroconductive by virtue of impurities and dissolved solids contained therein, said sensing probe being secured within a short length of pipe that is associated with the middle opening of a T connection which is inserted in a liquid line, said sensing probe including a boss which is secured against the ends of said short length of pipe by a threaded cap member with sealing means being interposed between said boss and said end of pipe, a Venturi tube welded at the inner surface of said pipe, said Venturi tube being positioned in the main flow of said liquid in close proximity to but downstream from said sensing probe, said Venturi tube having a first end extending into the main liquid flow, said end being bevelled so as to open generally away from said sensing probe with the second end of said Venturi tube also being bevelled but opening toward said sensing probe, whereby liquid drawn toward said sensing probe will thereafter be caused to flow into said second opening and away from said sensing probe by virtue of the vacuum established in said tube that is created by the liquid in said main flow moving past said first opening, whereby turbulence is created adjacent said sensing probe to assure good liquid contact with said sensing probe and also to promote a cleansing action upon said sensing probe.

References Cited
UNITED STATES PATENTS

| | | | |
|---|---|---|---|
| 2,409,073 | 10/1946 | Sias et al. | 73—304 XR |
| 2,635,546 | 4/1953 | Enyeart et al. | 103—25 XR |
| 2,866,336 | 12/1958 | Hitchcox | 73—304 |
| 2,934,700 | 4/1960 | Holaday | 324—61 |
| 3,179,920 | 4/1965 | McGinty | 340—244 |
| 3,230,770 | 1/1966 | Hermanson | 317—246 XR |
| 3,263,224 | 7/1966 | Berman et al. | 137—551 XR |

FOREIGN PATENTS 1,073,969   3/1954   France.

S. CLEMENT SWISHER, *Acting Primary Examiner.*

DONALD O. WOODIEL, *Examiner.*